(12) United States Patent
Fowler et al.

(10) Patent No.: US 6,538,400 B2
(45) Date of Patent: Mar. 25, 2003

(54) CONTROL SYSTEM FOR AN ELECTRIC MOTOR

(75) Inventors: Craig Rae Fowler, Caen (FR); Jerome Quere, Bieville-Beuville (FR); Dennis A. Kramer, Troy, MI (US); Enrico Fin, Lake Orion, MI (US); George Chene, Sterling Heights, MI (US); Ira B. Goldberg, Thousand Oaks, CA (US); Stephen Chiu, Thousand Oaks, CA (US); Charles Hopson, Lebanon, TN (US); Pascal Garrido, Kilworthy (CA); David M. Barry, Stratford Upon Avon (GB); Dan Rogovin, Newbury Park, CA (US)

(73) Assignee: Meritor Light Vehicle Technology, LLC, Troy, MI (US)

( * ) Notice: Subject to any disclaimer, the term of this patent is extended or adjusted under 35 U.S.C. 154(b) by 0 days.

(21) Appl. No.: 09/850,771

(22) Filed: May 8, 2001

(65) Prior Publication Data

US 2002/0167286 A1 Nov. 14, 2002

(51) Int. Cl.$^7$ ................................................ H02P 7/80
(52) U.S. Cl. ...................... 318/34; 318/139; 318/727; 318/798; 318/801; 318/805; 180/65.1; 180/65.3; 180/65.8
(58) Field of Search .................. 318/34, 35, 139, 318/727, 798, 801, 805; 180/65.1, 65.3, 65.8; 310/316.01, 318

(56) References Cited

U.S. PATENT DOCUMENTS

| | | | |
|---|---|---|---|
| 5,408,878 A | | 4/1995 | Lysen |
| 5,473,225 A | * | 12/1995 | Miyazaki ..................... 318/52 |
| 5,801,497 A | * | 9/1998 | Shamoto et al. ............ 318/139 |
| 6,064,141 A | | 5/2000 | Wiciel |
| 6,072,287 A | * | 6/2000 | Gataric ......................... 318/34 |
| 6,318,487 B2 | * | 11/2001 | Yanase et al. ............. 180/65.2 |
| 6,344,719 B2 | * | 2/2002 | Shibazaki et al. ............ 318/34 |
| 6,425,838 B1 | * | 7/2002 | Matsubara et al. ............. 475/5 |

FOREIGN PATENT DOCUMENTS

| | | |
|---|---|---|
| DE | 4338193 A1 | 5/1995 |
| JP | 3-243180 | 10/1995 |

* cited by examiner

Primary Examiner—Robert E. Nappi
Assistant Examiner—Rina I. Duda
(74) Attorney, Agent, or Firm—Carlson, Gaskey & Olds

(57) ABSTRACT

An apparatus for controlling multiple vehicle systems includes a single power supply that provides a direct current source. The power supply is comprised of a thirty-six volt (36 V) battery power distribution system. A converter is electrically connected to the power supply to convert direct current to alternating current. A plurality of induction motors are used to operate various vehicle systems. The motors receive alternating current via electrical connections between the converter and the motors. A central processor is connected to relays sending power to each of the motors and provides control signals to the motors based on input from control members used to activate each of the various vehicle systems. At least one sensor is associated with each of the motors to monitor voltage or current of the respective motor and to generate a diagnostic signal that is sent to the processor. The processor generates a warning signal when any of the diagnostic signals indicates that voltage within the respective motor is outside a predetermined range. A piezoelectric material is associated with each of the motors to provide an internal control signal for the motor. The piezoelectric material can be used to control acceleration or deceleration of the motor based on the rotational force of a rotor within the motor or can be use to activate an auxiliary winding in the motor based on mechanical input to the respective controller.

20 Claims, 2 Drawing Sheets

CONTROL SYSTEM FOR AN ELECTRIC MOTOR

BACKGROUND OF THE INVENTION

This invention relates to an apparatus for utilizing a utilizing a forty-two volt (42 V) power distribution system (42 V alternator, 36 V battery) to control multiple vehicle systems with a single controller including independent diagnostics for each system.

As more electrically controlled devices are incorporated into vehicles, the power supply for running these devices must also be increased. The standard twelve volt (12V) battery with a fourteen volt (14V) alternator that has traditionally been installed within the vehicle does not provide sufficient power to meet the increased demands.

To meet the demand for an increased power supply, the automotive industry is moving towards a thirty-six volt (36V)/forty-two volt (42V) alternator system. As this transition is made, hybrid systems that can support both voltages are needed. These hybrid systems are referred to as a twelve volt (12V)/thirty-six volt (36V) battery power distribution system or a fourteen volt (14V)/forty-two volt (42V) power distribution system. The use of a 36V/42V system permits the use of electrical components that could not previously be used in 12V systems. The 36V/42V system provides direct current (DC) to power motors that run the various vehicle operating systems such as window regulators, sunroofs, power locks, power mirrors, power seats, etc.

In a 36V/42V system, alternating current (AC) electric induction motors can be used for running the various vehicle operating systems. AC induction motors have a primary winding or stator that is connected to the power source. Current flow through the primary winding induces current flow in a secondary winding or rotor that rotates with respect to the stator. The use of AC induction motors requires conversion of the direct current power supply to alternating current. Thus, it is desirable to provide a system that can convert direct current to alternating current, and which can simultaneously provide power to multiple motors with unified control to operate multiple vehicle systems.

Typically, single-phase AC motors require an auxiliary winding with capacitors to start rotation of the rotor, which is expensive. Further, once the motor is running it can be difficult to accurately control the acceleration and deceleration of the motor to efficiently operate the respective vehicle system. Thus, it is desirable to provide a simplified and improved starting mechanism for the induction motor. The motor should also have improved feedback control for efficient operation.

SUMMARY OF THE INVENTION

In a disclosed embodiment of this invention, an apparatus for controlling multiple vehicle systems includes a 36V/42V power distribution system that generates direct current. A converter mechanism is electrically connected to the power distribution system to convert the direct current to alternating current. A plurality of induction motors are used to operate various vehicle systems. The motors receive alternating current via electrical connections between the converter mechanism and the motors. A plurality of control members actuate the various vehicle systems and a central processor is connected to each of the motors for providing control signals to the motors based on input from the control members.

In one embodiment, at least one sensor is associated with each of the motors to monitor voltage of the respective motor and generate a specific diagnostic signal for that motor that is sent to the processor. The processor generates a warning signal when any of the diagnostic signals indicates that voltage within the respective motor is less than a predetermined limit.

In one embodiment, the induction motor for operating a vehicle system has a stator electrically connected to the converter mechanism and a rotor that rotates with respect to the stator. A central processor is connected to the motor to provide a control signal to a power converter that controls power into the motor based on input from a control member used to activate the respective vehicle system. A piezoelectric material is mounted on the rotor and is responsive to the centrifugal force generated as the rotor rotates with respect to the stator. The piezoelectric material generates a feedback signal for regulation of acceleration and deceleration of the rotor.

In another embodiment, the induction motor with the rotor includes a piezoelectric material that is associated with the control member such that when a mechanical force is applied to the control member a voltage pulse is generated by the piezoelectric material to start the motor.

These and other features of the present invention can be best understood from the following specification and drawings, the following of which is a brief description.

DETAILED DESCRIPTION OF A PREFERRED EMBODIMENT

Figure 1:
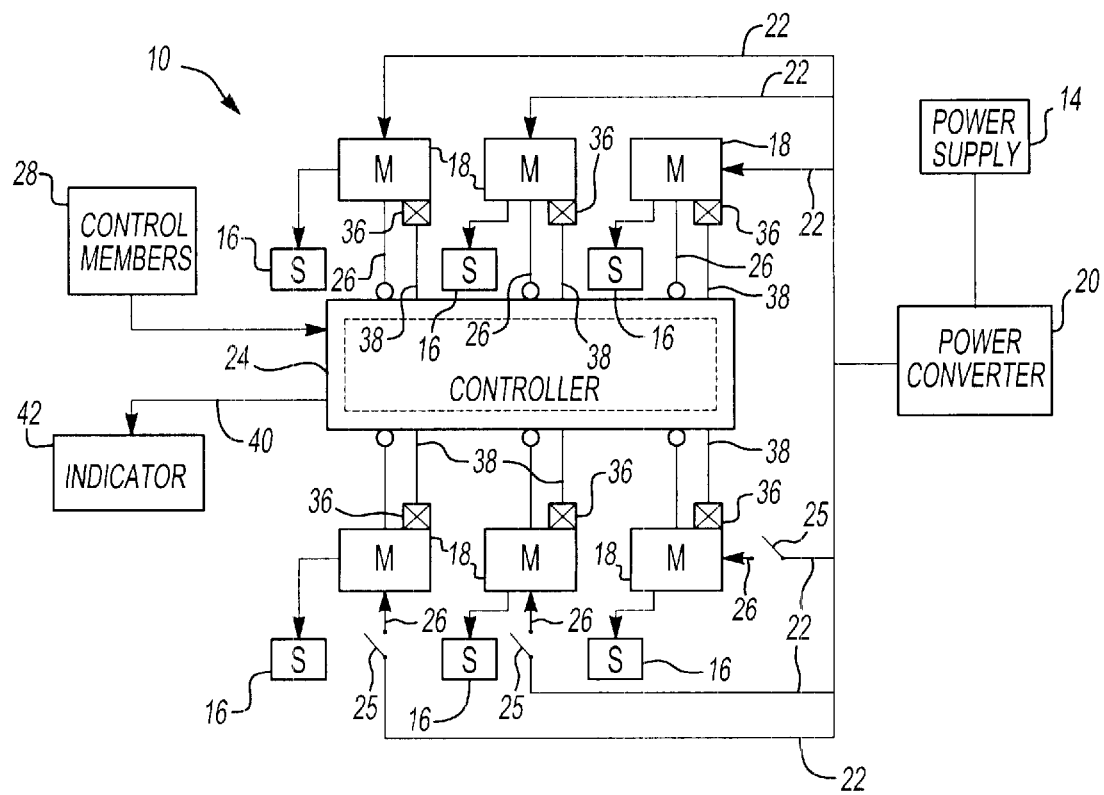
FIG. 1 is a schematic diagram of a control system incorporating the subject invention.

A system for controlling multiple vehicle actuation operations, such as window, power steering, etc., is shown schematically at 10 in FIG. 1. The system 10 has a twelve volt (12V)/thirty-six volt (36V) battery power distribution system 14. The operation of batteries is well known in the art and thus will not be discussed in detail. The system 10 provides 12V power for vehicle operations that have traditionally required 12V power and provides 36V power for additional vehicle systems 16 that require more power to operate accurately and efficiently. The 12V/36V system provides direct current (DC) to power motors 18 that run the various vehicle operating systems 16 such as window regulators, sunroofs, power locks, power mirrors, power seats, etc., for example. Thus, the system 10 utilizes a single power supply 14 that provides a direct current source.

A power converter 20 is electrically connected to the power supply 14 for converting direct current to alternating current (AC). The motors 18 are induction motors that receive the alternating current via electrical connections 22 between the converter 20 and the motors 18. The induction motors 18 can be single phase or multiple phase motors. The power converter 20 preferably includes semiconductor switches and required logic programming to convert the power from DC to AC.

A central processor or controller 24 is connected to each of the motors 18 to provide control signals 26 to the converters or relay switches 25 based on input from control members 28 used to activate each of the various vehicle systems 16. Control members 28 can be pushbuttons, switches, or other similar members known in the art. Thus, the power is remotely converted from DC to AC with a single converter 20 and is sent to each of the motors 18 via relays controlled by a single controller 24. One of the benefits of this configuration in a 36V system is that the number of MOSFETs (metal oxide semiconductor field-effect transistor) required can be minimized. The operation of MOSFETs is well known.

Figure 2A:
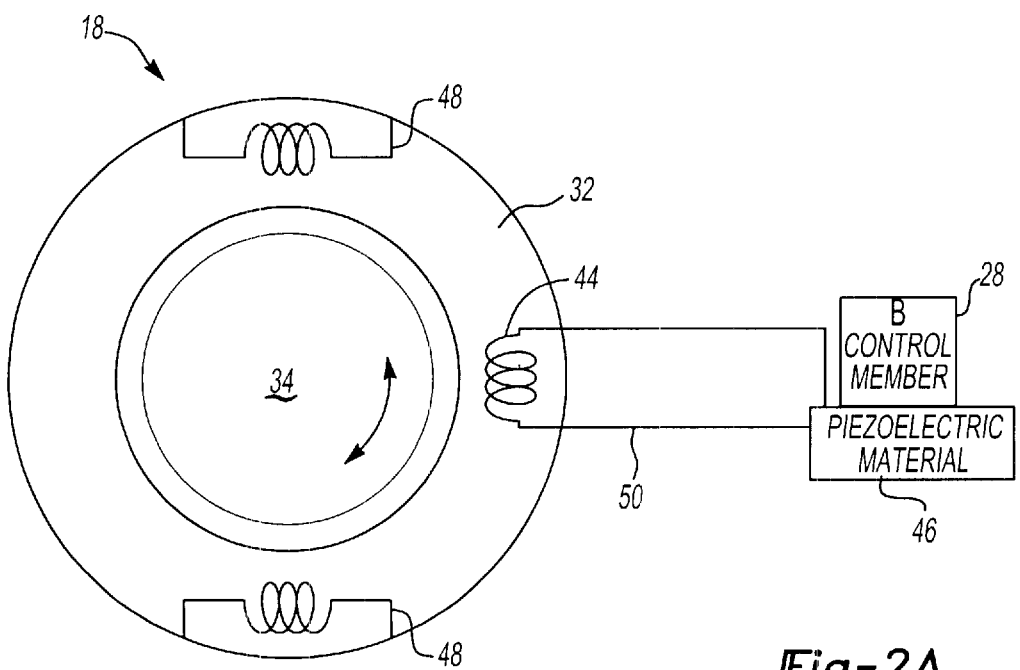
FIG. 2A is a schematic of an induction motor incorporating one embodiment of the invention.
Figure 3:
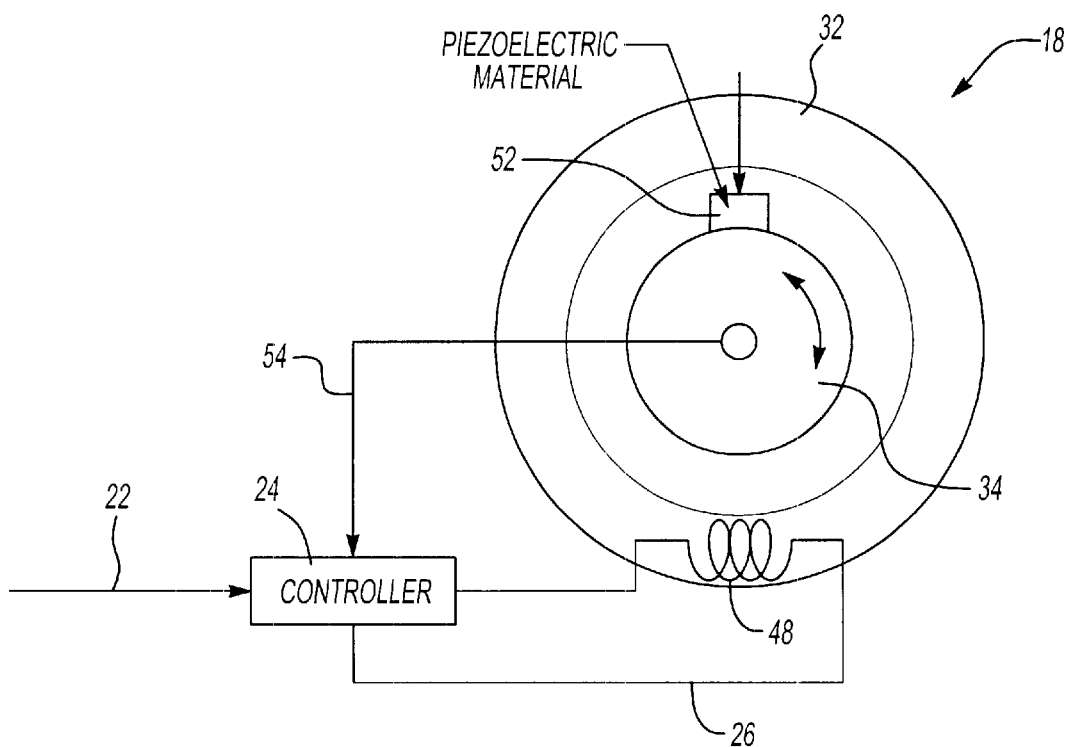
FIG. 3 is a schematic of an induction motor incorporating an alternate embodiment of the invention.

The induction motors 18 shown in FIGS. 2A and 3 are alternating current motors in which a primary winding 48 on one member, typically a stator 32, is connected to the power converter 20 and a secondary winding on the other member, typically the rotor 34, carries only current induced by the magnetic field of the primary winding. Preferably, each motor 18 includes at least one sensor 36, shown in FIG. 1, which monitors the voltage (V) and/or current (A) of the respective motor 18. The sensors 36 each generate a specific diagnostic signal 38 that is representative of the operating condition for the respective motor 18. The diagnostic signals 38 are sent to the controller 24, which continuously monitors the operating status of each of the motors 18.

Diagnostics for electrical components and power and control signal lines are important for periodic maintenance and control checks. Placing appropriate sensors on the motors 18 or on the power or control signal lines associated with the motors 18 can provide useful information on the health of the various vehicle actuation systems 16. The information is sent to the controller 24 where it can be downloaded to a diagnostic computer for maintenance purposes.

Optionally, the controller 24 can generate a warning signal 40 when any of the diagnostic signals 38 indicates that voltage V within the respective motor 18 is less than a predetermined limit. The warning signal 40 is then sent to an indicator 42 in the vehicle dash that can provide a visual or audible indication to a vehicle occupant that there has been a power loss for one of the vehicle actuation systems 16.

One advantage with voltage sensors 36 on the motors 18 is for an anti-squeeze feature. Anti-squeeze relates to the prevention of the raising of a vehicle window when an obstacle, such as a hand, is between the top edge of the window and the door frame. When the obstacle is detected, the window cannot be raised until the obstacle is removed. If a three-phase induction motor 18 is used for operating the vehicle windows, the voltage sensors 36 can be used to operate the anti-squeeze feature.

As shown in FIGS. 2A and 3, induction motors 18 include an auxiliary winding 44 that is used to start the rotation of the rotor 34 with respect to the stator 32. In the preferred embodiment, a piezoelectric material 46 is associated with each of the controllers 28 used to activate each of the various vehicle systems 16. The control members 28 can be buttons, toggle switches, cam mechanism, or other types of actuators, known in the art. Piezoelectric material is well known in the art and is a material that has the ability to generate a voltage when a mechanical force is applied to the material.

Figure 2B:
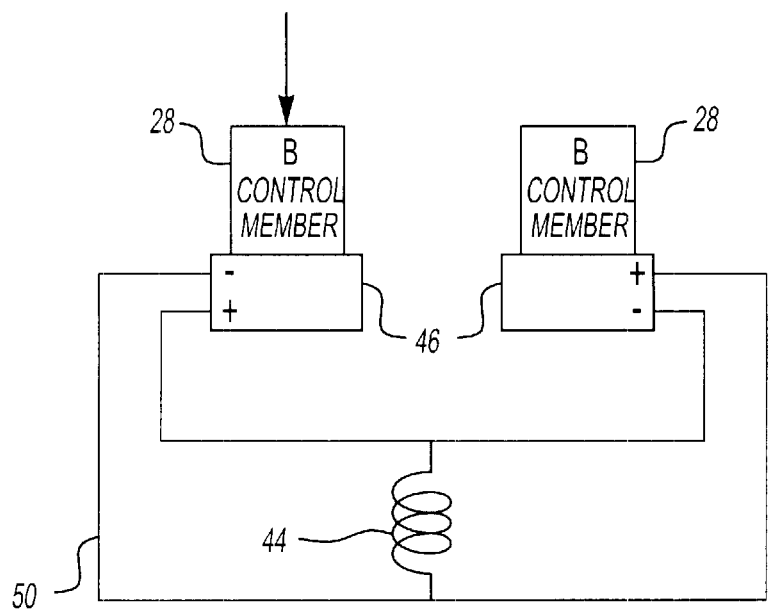
FIG. 2B is a magnified view of a portion of FIG. 2A.

When a mechanical force is applied to the control member 28 a voltage pulse is generated by the piezoelectric material 46 which energizes the auxiliary winding 44 in the motor 18 and initiates rotation of the rotor 34 with respect to the stator. Thus, the piezoelectric material 46 generates an excitation or feedback signal 50 for the motor 18. As shown in FIG. 2B, when the controller button 28 is depressed, shown to the left, the signal 50 is used to activate the auxiliary winding 44. When the controller button 28 is not depressed, shown to the right, there is no signal sent to the auxiliary winding 44.

It is also desirable to provide a simple mechanism to quickly accelerate/decelerate the motor 18 once the motor 18 has received a control signal to begin rotation in the required direction. In one embodiment, piezoelectric material 52 is mounted on the rotor 34 for rotation with the rotor 34. The piezoelectric material 52 allows varying current to pass through based on the force exerted on the material 52. The piezoelectric material 52 is mounted on the rotor 34 such that it is impressed by centrifugal forces exerted by the rotor 34. As the rotor 34 begins to accelerate/decelerate, the current passing through the piezoelectric material 52 can be used to regulate the acceleration/deceleration in a feedback fashion. Thus, the piezoelectric material 52 provides a feedback signal 54 that varies based on the centrifugal force applied to the rotor 34. The feedback signal 54 can be sent to the central controller 24 to regulate acceleration and deceleration of the rotor 34.

Although a preferred embodiment of this invention has been disclosed, it should be understood that a worker of ordinary skill in the art would recognize many modifications come within the scope of this invention. For that reason, the following claims should be studied to determine the true scope and content of this invention.

What is claimed is:

1. An apparatus for controlling multiple vehicle systems comprising:

a single power supply providing a direct current source;

a power converter electrically connected to said power supply for converting direct current to alternating current;

a plurality of induction motors for operating various vehicle systems, said motors receiving alternating current via electrical connections between said converter and said motors;

a central processor connected to relays that send power to each of said motors for providing control signals to said motors based on input from control members used to activate each of said various vehicle systems;

at least one sensor associated with each of said motors for monitoring voltage or current of said respective motor and generating a diagnostic signal that is sent to said processor; and a piezoelectric material associated with each of said motors for providing an internal feedback control signal for said motor.

2. An apparatus as recited in claim 1 wherein said single power supply is a thirty-six volt (36 V) battery power distribution system.

3. An apparatus as recited in claim 2 wherein said processor generates a warning signal when any of said diagnostic signals indicates that voltage or current within said respective motor is less than a predetermined limit.

4. An apparatus as recited in claim 2 wherein said piezoelectric material is mounted on a rotor that rotates within each of said induction motors, said piezoelectric material providing a feedback signal that varies based on the centrifugal force experienced by said rotor wherein said feedback signal regulates acceleration and deceleration of said rotor.

5. An apparatus as recited in claim 2 wherein said piezoelectric material is associated with each of said control members used to activate said various vehicle systems such that when a mechanical force is applied to said control member a voltage pulse is generated by said piezoelectric material which energizes an auxiliary winding in said motor.

6. An apparatus for controlling multiple vehicle systems comprising:

a forty-two volt (42 V) power distribution system for generating direct current;

a converter mechanism electrically connected to said power distribution system for converting direct current to alternating current;

a plurality of induction motors for operating various vehicle systems, said motors receiving alternating current via electrical connections between said converter mechanism and said motors;

a plurality of control members for actuating said various vehicle systems; and a central processor connected to each of said motors for receiving sensor feedback signals from said motors based on input from said control members.

7. An apparatus as recited in claim 6 including at least one sensor associated with each of said motors for monitoring voltage or current of said respective motor and generating a diagnostic signal that is sent to said processor.

8. An apparatus as recited in claim 7 wherein said processor generates a warning signal when any of said diagnostic signals indicates that voltage or current within said respective motor is outside a predetermined range.

9. An apparatus as recited in claim 8 wherein said warning signal is transmitted to an indicator installed within a vehicle dash.

10. An apparatus as recited in claim 6 wherein each of said induction motors is comprised of a stator electrically connected to said converter mechanism and a rotor that rotates with respect to said stator.

11. An apparatus as recited in claim 10 including a piezoelectric material mounted on said rotor and responsive to the centrifugal force generated as said rotor rotates with respect to said stator, said piezoelectric material generating a feedback signal for regulation of acceleration and deceleration of said rotor.

12. An apparatus as recited in claim 10 including a piezoelectric material associated with each of said control members such that when a mechanical force is applied to said controller a voltage pulse is generated by said piezoelectric material to start said motor.

13. An apparatus as recited in claim 12 wherein said voltage pulse energizes an auxiliary winding in said motor.

14. An apparatus for controlling multiple vehicle systems comprising:

a single power supply providing a direct current source;

a converter electrically connected to said power supply for converting direct current to alternating current;

at least one induction motor for operating a vehicle system wherein said motor has a stator electrically connected to said converter and a rotor that rotates with respect to said stator;

a central processor connected to relays that send power to said motor based on input from a control member used to activate said vehicle system; and a piezoelectric material mounted on said rotor and responsive to the centrifugal force generated as said rotor rotates with respect to said stator, said piezoelectric material generating a feedback signal for regulation of acceleration and deceleration of said rotor.

15. An apparatus as recited in claim 14 wherein said single power supply is a thirty-six volt (36 V) battery power distribution system.

16. An apparatus as recited in claim 15 including at least one sensor associated with said motor for monitoring motor voltage or current and generating a diagnostic signal that is sent to said processor.

17. An apparatus as recited in claim 16 said processor generates a warning signal when said diagnostic signal indicates that voltage within said motor is outside a predetermined range.

18. An apparatus for controlling multiple vehicle systems comprising:

a single power supply providing a direct current source;

a converter electrically connected to said power supply for converting direct current to alternating current;

at least one induction motor for operating a vehicle system wherein said motor has a stator electrically connected to said converter and a rotor that rotates with respect to said stator;

a central processor connected to relays for providing a control signal to said motor based on input from a control member used to activate said vehicle system; and a piezoelectric material associated with said control member such that when a mechanical force is applied to said control member a voltage pulse is generated by said piezoelectric material to start said motor.

19. An apparatus as recited in claim 18 wherein said single power supply is a thirty-six volt (36 V) battery power distribution system.

20. An apparatus as recited in claim 19 wherein said voltage pulse energizes an auxiliary winding in said motor.

* * * * *